United States Patent [19]

Minagawa et al.

[11] Patent Number: 4,970,688

[45] Date of Patent: Nov. 13, 1990

[54] MEMORY DEVICE HAVING OPERATING FUNCTION

[75] Inventors: Tsutomu Minagawa, Fujisawa; Naoyuki Kai, Tokyo; Masahide Ohhashi; Yukimasa Uchida, both of Yokohama, all of Japan

[73] Assignee: Kabushiki Kaisha Toshiba, Kawasaki, Japan

[21] Appl. No.: 397,837

[22] Filed: Aug. 24, 1989

[30] Foreign Application Priority Data

Aug. 26, 1988 [JP] Japan .................................. 63-211843

[51] Int. Cl.⁵ ............................................ G11C 13/00
[52] U.S. Cl. .............................. 365/189.01; 365/189.05
[58] Field of Search ..................... 365/189.01, 189.05, 365/230.01, 230.06

[56] References Cited

U.S. PATENT DOCUMENTS 4,646,270  2/1987  Voss ..................................... 365/230

Primary Examiner—Terrell W. Fears
Attorney, Agent, or Firm—Finnegan, Henderson, Farabow, Garrett and Dunner

[57] ABSTRACT

A memory device having an operating function includes a memory cell array, a register, and a logical opeation circuit. The memory cell array has memory cells arranged in a matrix form of m rows × n columns. Data readout or write-in operation with respect to the memory cell array is effected in the unit of n bits of one row. The register has a bit width corresponding to one row of the memory cell array. Data of one row is read out from the memory cell array and is processed by the logical operation circuit together with data stored in the register. The result of operation is written into a desired row of the memory cell array. The memory cell array, register, and logical operation circuit are formed in the same integrated circuit, thus permitting processing such as picture element processing to be effected inside the integrated circuit, without the need to use an external data bus.

14 Claims, 8 Drawing Sheets

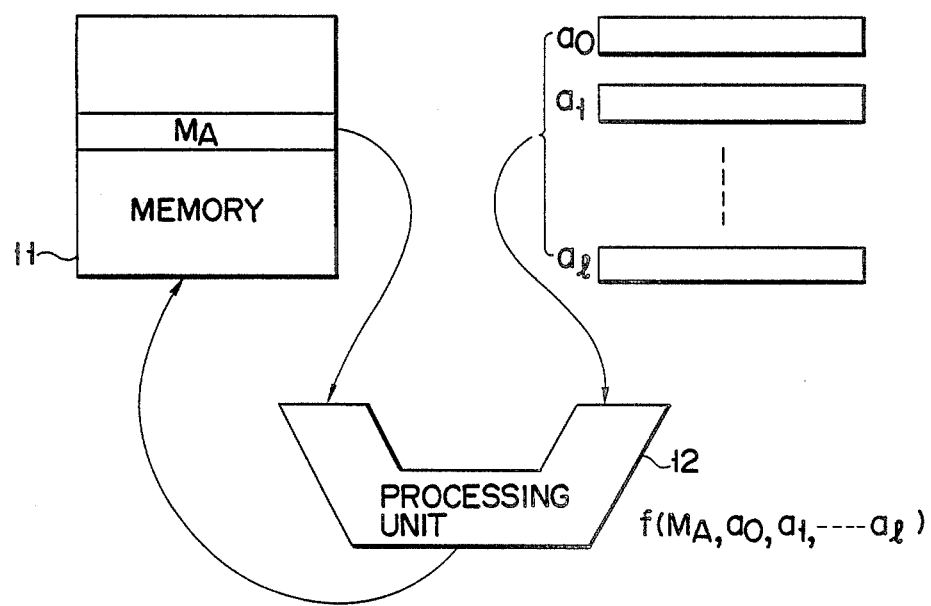
F I G. 2

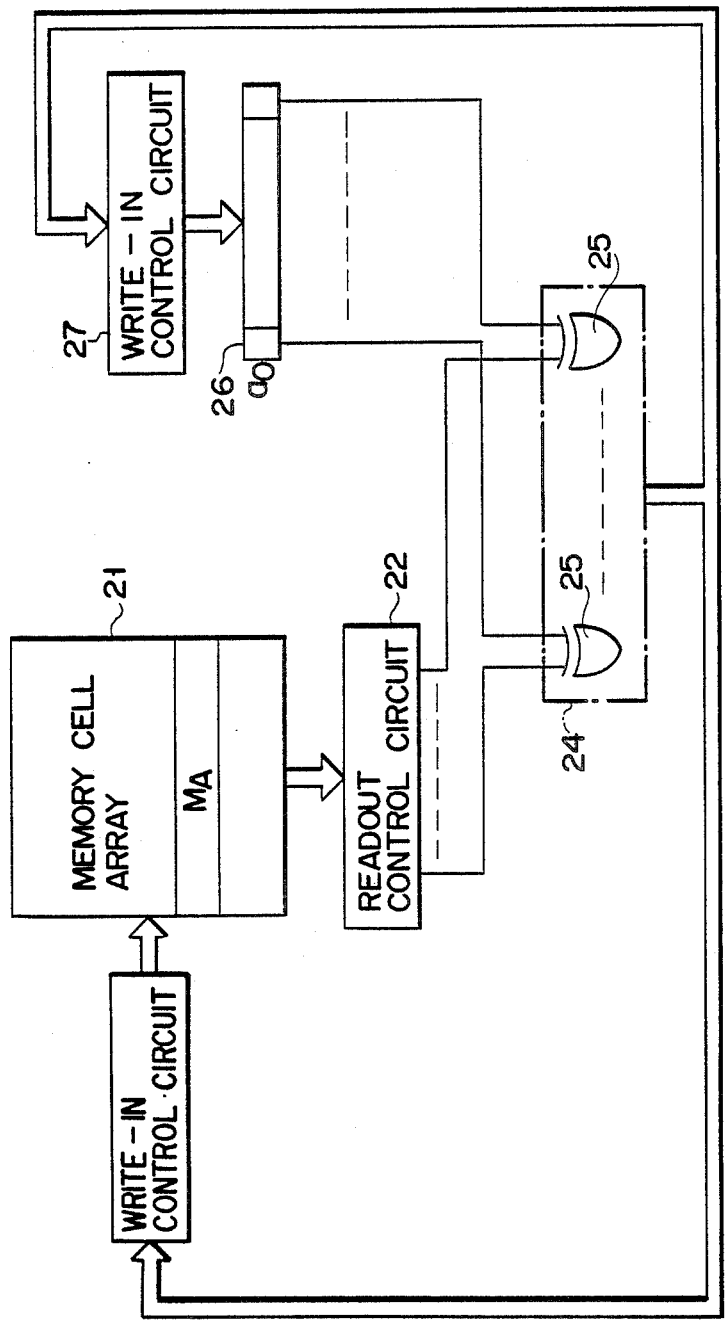
F I G. 3

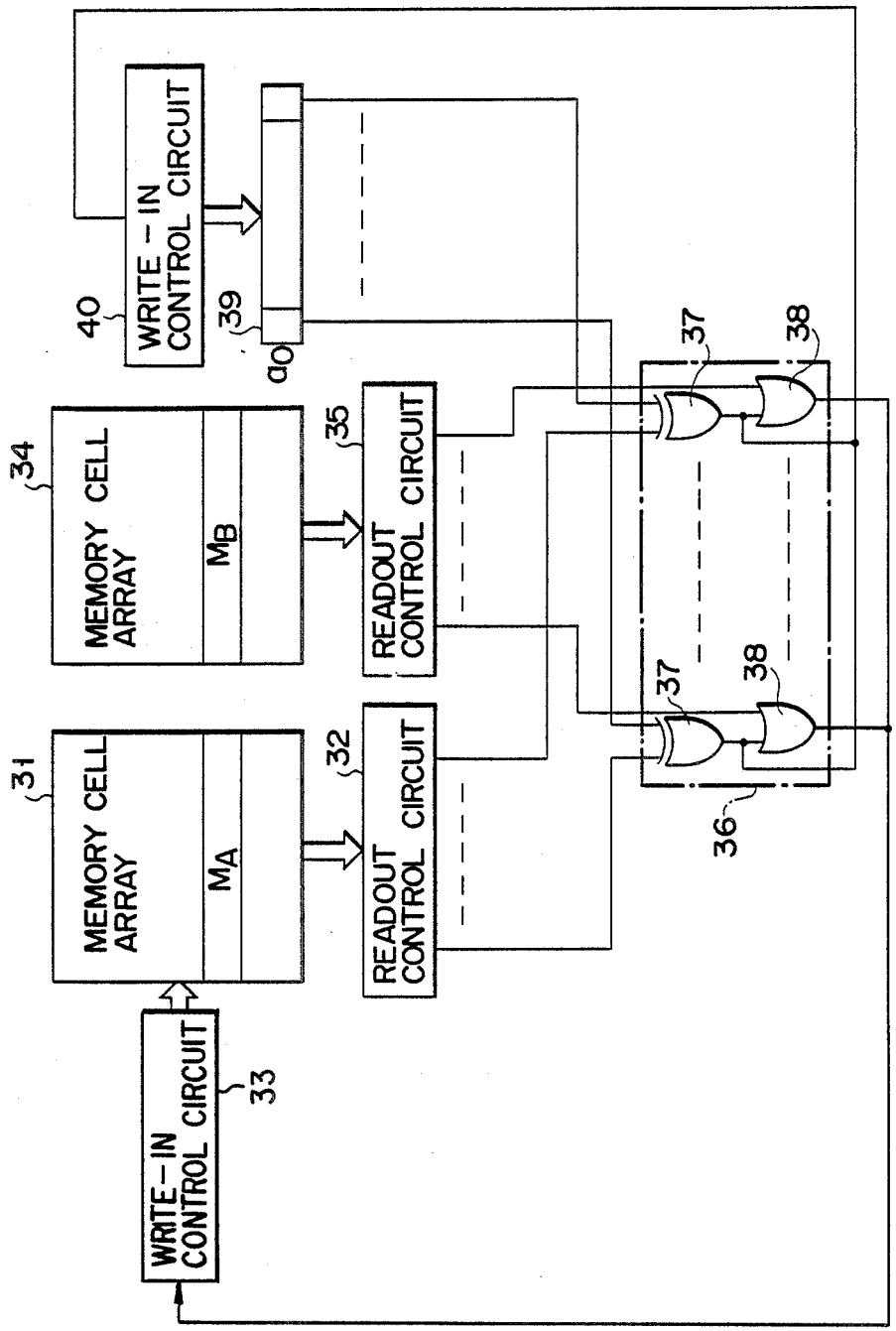

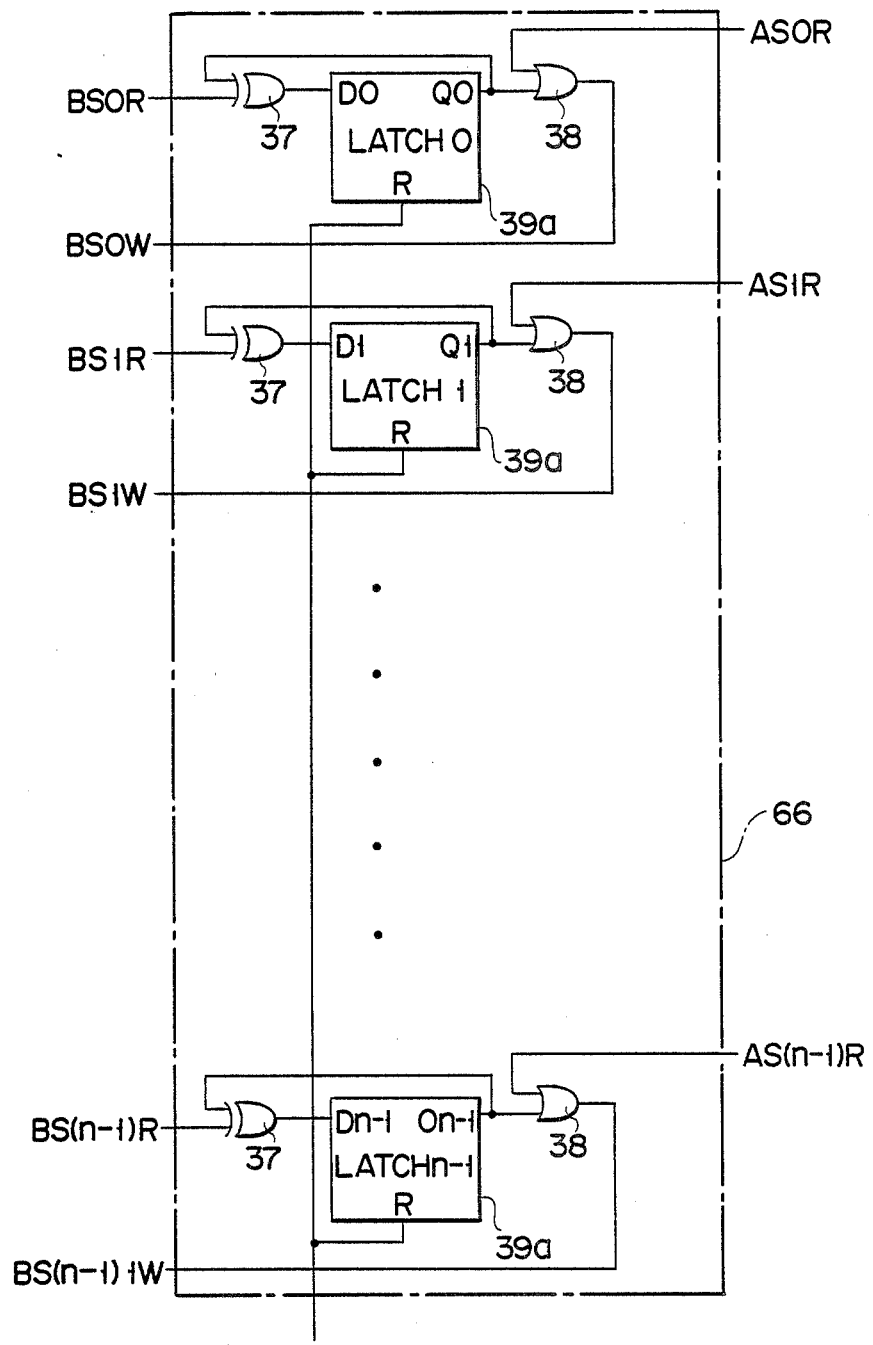
F I G. 8

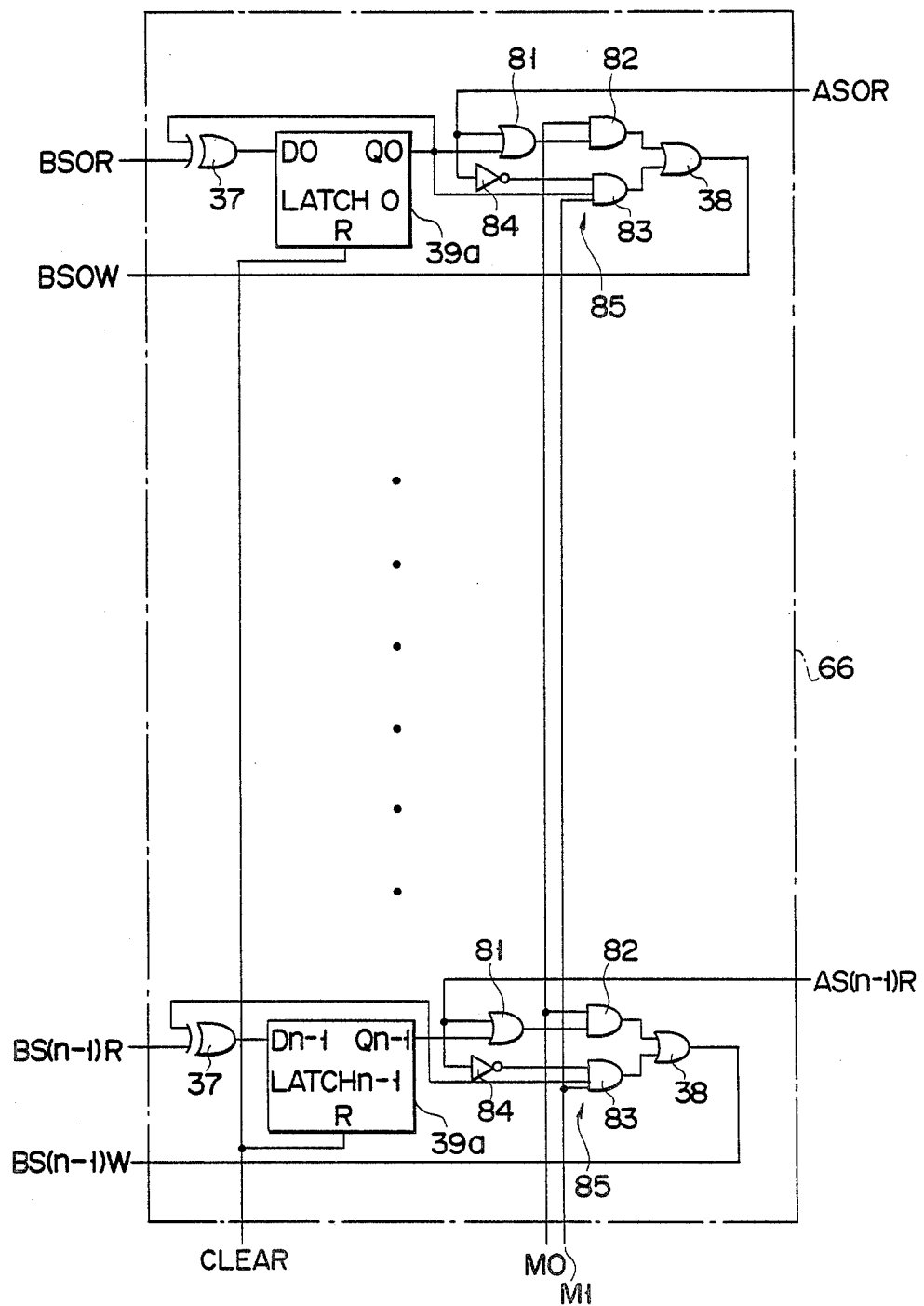
F I G. 9

MEMORY DEVICE HAVING OPERATING FUNCTION

BACKGROUND OF THE INVENTION

1. Field of the Invention

This invention relates to a memory device having an operating function, and more particularly, to a memory device having an operating function used for graphic processing in which a large amount of data must be processed at a high speed.

2. Description of the Related Art

In a case where picture elements such as graphic images are processed, a processing unit is required to process a large amount of data in a memory device at a high speed. The memory device used for graphic processing is required to have a function of mixedly processing picture element data in addition to the function of an image memory. The processing of picture element data includes registration of image data and data processing of data of adjacent picture elements or a plurality of picture elements.

An example of a conventional processing unit having an operating function for mixedly processing picture element data is constructed as shown in the form of a block diagram in FIG. 1. The processing unit shown in this Figure includes operation processing unit 91, system memory 92, and image memory 93 which are connected to each other via data bus 94. Image memory 93, in which image data is stored, is arranged apart from operation processing unit 91. Operation processing unit 91 reads out data from image memory 93 via data bus 94, processes the readout data, and writes the processed data into image memory 93, again via data bus 94. For this reason, even if the processing capacity of operation processing unit 91 is extremely large, the performance of the whole processing unit is determined by time required for data readout/write-in operations in image memory 93 and an amount of data to be processed at each access. In order to effectively operate operation processing unit 91, it is necessary to reduce time for data readout/write-in operations in image memory 93 and increase an amount of data to be processed by operation processing unit 91 at each access. With recent image memories, the time required for readout/write-in operations have been gradually reduced and high-speed and small-capacity image memories have been developed for special applications. However, they are generally expensive and are not suitable for a large capacity. The width of data to be read out or written in at each access is limited to 1-bit width, 4-bit width or 8-bit width. In order to increase the data width, a large number of memories connected in parallel must be used, and there are economical and physical limitations.

Based on the fact as described above, various attempts have been made to reduce time for readout/write-in operation in image memory 93 to a minimum, increase the number of bits of data bus 94 to a maximum and enhance the processing capacity of operation processing unit 91 so as to increase the band width and enhance the performance of the whole processing unit.

As described above, since the operation processing unit and memory device are separated from each other in the conventional processing unit having a function of mixedly processing picture element data, a large amount of image data cannot be processed at a high speed when operation processing such as image processing is effected.

SUMMARY OF THE INVENTION

Accordingly, an object of this invention is to provide a memory device having an operating function capable of processing a large amount of data at a high speed.

The above object can be attained by a memory device having a operating function comprising a first memory cell array having memory cells arranged in a matrix form of m rows x n columns; a first readout control circuit for selecting one of the rows of the first memory cell array to read out n-bit data; a first write-in control circuit for selecting one of the rows of the first memory cell array to write n-bit data; a register arranged independent from the first memory cell array, for storing n-bit data; and a logical operation circuit for logically processing n-bit data read out from the first memory cell array under a control of the first readout control circuit with the content of a corresponding one of bits of n-bit data stored in the register used as a variable to derive the result of logical operation for each bit, wherein the first memory cell array, the first readout control circuit, the first write-in control circuit, the register and the logical operation circuit are formed in the same integrated circuit.

Data is read out from or written into the memory cell array having the memory cells of m rows x n columns in the unit of n bits for each row. Data of one row is read out from the memory cell array and the readout data and data stored in the register are processed by means of the logical operation circuit. The result of the operation is written into a desired row of the memory cell array. Since the memory cell array, register, logical operation circuit and the like are formed in the same integrated circuit, operational processing such as picture element processing can be effected inside the integrated circuit without using an external data bus. As a result, a large amount of picture element data can be processed at a high speed.

Thus, a memory device having an operating function capable of processing a large amount of picture element data at a high speed can be provided.

BRIEF DESCRIPTION OF THE DRAWINGS

FIG. 2 is a block diagram for illustrating the basic construction of a memory device having an operating function of this invention;

FIG. 3 is a block diagram showing the construction of a memory device having an operating function according to a first embodiment of this invention;

FIGS. 4A and 4B are diagrams for explaining the operation of the memory device of the first embodiment shown in FIG. 3 and showing an example of the memory state of picture element data of the memory cell array;

FIG. 5 is a block diagram showing the construction of a memory device having an operating function according to a second embodiment of this invention;

FIGS. 6A to 6C are diagrams for explaining the operation of the memory device of the second embodiment shown in FIG. 5 and showing an example of the memory state of picture element data of each memory cell array;

FIG. 8 is a circuit diagram showing the detail construction of a fill circuit in the applied circuit of FIG. 7;

FIG. 9 is a circuit diagram showing another detail construction of a fill circuit in the applied circuit of FIG. 7;

DETAILED DESCRIPTION OF THE PREFERRED EMBODIMENTS

Figure 1:
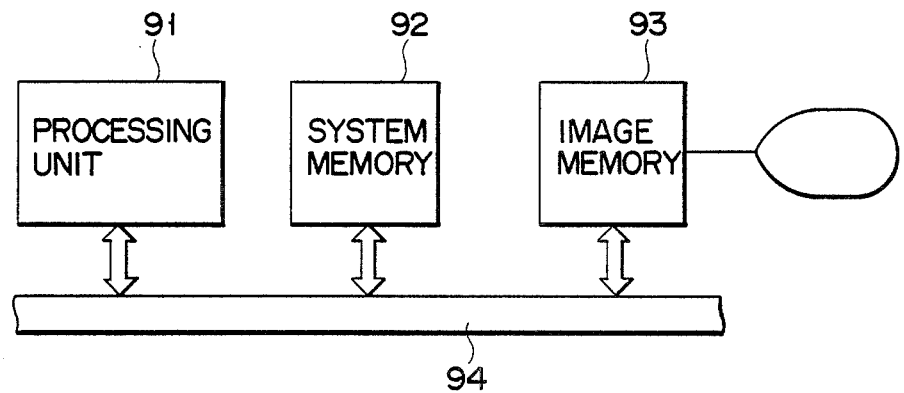
FIG. 1 is a block diagram showing the conventional processing device having a function of processing picture element data in connection with each other.

FIG. 2 is a block diagram for illustrating the basic construction of a memory device having an operating function of this invention. As shown in FIG. 2, memory 11 includes memory cells as data storing elements arranged in a matrix form of m rows x n columns. Memory 11 is constructed such that data can be written or read out in the unit of n bits for each row. Operation unit 12 performs the logical operation for function $f(M_A'a_0'a_1, \ldots, a_l)$ having arguments $M_A'a_0'$ $M_A'$ $a_0'$. . ., and $a_l$ are formed of data of n-bit width and can be derived as output data of a register constituted by a latch of n-bit width or n-bit width data read out from memory 11 or another memory (not shown).

With the above construction, operation unit 12 processes data $M_A$ of one row read out from memory 11 in connection with other arguments $a_0, a_1, \ldots, a_l$. The result of operation by operation unit 12 is written into a desired row of memory 11.

FIG. 3 is a block diagram showing the construction of a memory device having an operating function according to a first embodiment of this invention and obtained by constituting the memory device of FIG. 2 by using concrete circuits. Memory cell array 21 corresponds to memory 11 of FIG. 2 and includes memory cells as data storing elements arranged in a matrix form of m rows x n columns. Readout control circuit 22 selects a desired one of the rows of memory cell array 21 and effects the control operation to read out n-bit data from n memory cells of the selected row. Write-in control circuit 23 selects a desired one of the rows of memory cell array 21 and effects the control operation to write n-bit data into n memory cells of the selected row. Logic operation circuit 24 corresponds to operation unit 12 of FIG. 2 and is constituted by n exclusive-OR circuits 25. Register 26 includes n latches for storing argument $a_0$ constructed by n-bit data. Write-in control circuit 27 performs the control operation to write data into n latches of register 26. Further, memory cell array 21, readout control circuit 22, write-in control circuit 23, logical operation circuit 24, register 26 and write-in control circuit 27 are formed in the same integrated circuit, and the entire elements are formed on one chip.

With this construction, n-bit memory data $M_A$ of a desired row are read out from memory cell array 21 by use of readout control circuit 22 and supplied together with n-bit data $a_0$ stored in register 26 to logical operation circuit 24. Logical operation circuit 24 performs the logical operation to derive exclusive-OR data between bits of data $M_A$ and corresponding bits of data $a_0$ by using n exclusive-OR circuits 25. The result of the logical operation is written into n-bit memory cells of the initially selected one row of memory cell array 21 under a control of write-in control circuit 23 and written into register 26 under a control of write-in control circuit 27.

Figures 4A, 4B, 6A, 6B, 6C:
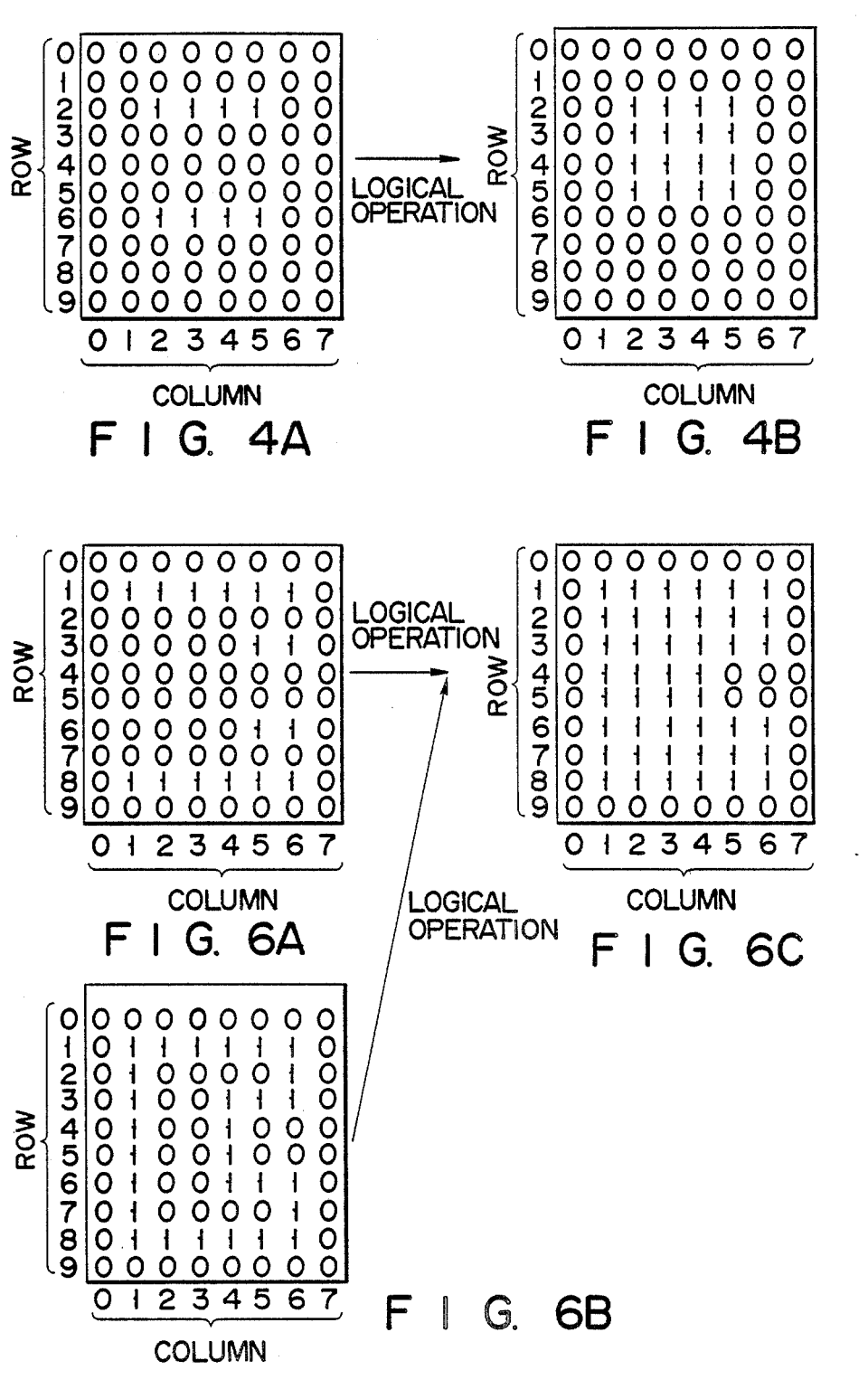

Next, referring to FIGS. 4A and 4B, the operation of the memory device shown in FIG. 3 is explained. In this example, memory cell array 21 is formed of memory cells arranged in a matrix form of 10 rows × 8 columns (m=10 and n=8). FIG. 4A shows a data storing state of picture element data of memory cell array 21 at a time before the operational processing is effected and FIG. 4B shows a data storing state of picture element data at a time after the operational processing has been effected.

First, 8-bit data on row "0" or the 0th row of memory cell array 21 is read out and supplied to logical operation circuit 24. At the same time, 8-bit data stored in register 26 is also supplied to logical operation circuit 24. In this case, the content of register 26 is previously cleared and all the 8-bit memory data is set at "0". Then, exclusive-OR circuits 25 of logical operation circuit 24 perform the logical operation to derive exclusive-OR data between 8 bit data from memory cell array 21 and corresponding bit data from register 26 and the result of the logical operation is written into row "0" of memory cell array 21 and register 26. That is, 8 bit data stored in row "0" of memory cell array 21 before the logical operation is effected are all "0" as shown in FIG. 4A and 8 bit data stored in register 26 are all "0" so that all the 8 bit data stored in row "0" of memory cell array 21 are all set to "0" as shown in FIG. 4B after the logical operation is effected and data has been written.

Next, the logical operation is effected for 8-bit data in row "1" or the first row of memory cell array 21 and 8-bit data stored in register 26 and the result of the logical operation is written into the first row of memory cell array 21 and register 26. In this case, since 8 bit data stored in the first row of memory cell array 21 before the logical operation is effected are all "0" as shown in FIG. 4A and 8 bit data stored in register 26 are all "0", all the 8 bit data stored in the first row of memory cell array 21 after the logical operation is effected are all set to "0" as shown in FIG. 4B.

Next, the logical operation is effected for 8-bit data in row "2" or the second row of memory cell array 21 and 8-bit data stored in register 26 and the result of the logical operation is written into the second row of memory cell array 21 and register 26. In this case, 8-bit data stored in the second row of memory cell array 21 before the logical operation is effected is "0, 0, 1, 1, 1, 1, 0, 0" as shown in FIG. 4A and 8 bit data stored in register 26 are all "0". Therefore, 8-bit data stored in the second row of memory cell array 21 after the logical operation is effected is set to "0, 0, 1, 1, 1, 1, 0, 038 as shown in FIG. 4B.

Similarly, the logical operation is effected for 8-bit data in row "3" or the third row of memory cell array 21 and 8-bit data stored in register 26. In this case, 8 bit data stored in the third row of memory cell array 21 before the logical operation is effected are all "0" and 8-bit data stored in register 26 is "0, 0, 1, 1, 1, 1, 0, 0". Therefore, 8-bit data stored in the third row of memory cell array 21 after the logical operation is effected is set to "0, 0, 1, 1, 1, 1, 0, 0".

In the same manner as in the case of third row, the logical operation is effected for 8-bit data in each of the fourth and fifth rows of memory cell array 21 and 8-bit data stored in register 26. In this case, 8 bit data stored in each of the fourth and fifth rows of memory cell array 21 before the logical operation is effected are all "0" and 8-bit data stored in register 26 is "0, 0, 1, 1, 1, 1, 0, 0". Therefore, 8-bit data stored in each of the fourth and fifth rows of memory cell array 21 after the logical operation is effected is set to "0, 0, 1, 1, 1, 1, 0, 0".

Next, the logical operation is effected for 8-bit data in the sixth row of memory cell array 21 and 8-bit data stored in register 26. In this case, 8-bit data stored in the sixth row of memory cell array 21 before the logical operation is effected is "0, 0, 1, 1, 1, 1, 0, 0" and 8-bit data stored in register 26 is "0, 0, 1, 1, 1, 1, 0, 0". Therefore, 8-bit data stored in the sixth row of memory cell array 21 after the logical operation is effected are all set to "0".

In the same manner as in the 0th and first rows, in each of the seventh and ninth rows, 8 bit data stored in the first row of memory cell array 21 before the logical operation is effected are all "0" and 8 bit data stored in register 26 are all "0". Therefore, all the 8 bit data stored in the first row of memory cell array 21 after the logical operation is effected are all set to "0".

In this way, as shown in FIG. 4B, picture element data obtained by logically processing the original picture element data is stored in memory cell array 21.

In the memory device of FIG. 3, all the circuits are formed in the same integrated circuit and an amount of data which can be processed in each access to memory cell array 21 can be set equal to data amount of one row. Therefore, logic operation circuit 24 can be efficiently operated and a large amount of picture element data can be processed at a high speed.

FIG. 5 is a block diagram showing the construction of a memory device having an operating function according to a second embodiment of this invention and realized by using concrete circuits to constitute the memory device of FIG. 2. In this embodiment, two memory cell arrays each corresponding to memory 11 of FIG. 2 are provided. That is, in FIG. 5, each of memory cell arrays 31 and 34 corresponds to memory 11 of FIG. 2 and has memory cells as data storing elements arranged in a matrix form of m rows x n columns. Each of readout control circuits 32 and 35 selects a desired row of a corresponding one of memory cell arrays 31 and 34 and effects the control operation to read out memory data of n-bit memory cells of one row. Write-in control circuit 33 selects a desired row of memory cell array 31 and effects the control operation to write data into n-bit memory cells of one row. Further, logic operation circuit 36 corresponds to operation unit 12 of FIG. 2 and includes n exclusive-OR circuits 37 and n OR circuits 38. Register 39 includes n latches for storing argument $a_0$ constructed by n-bit data. Write-in control circuit 40 effects the control operation to write data into the n latches of register 39. Also, in this embodiment, memory cell arrays 31 and 34, readout control circuits 32 and 35, write-in control circuit 33, logic operation circuit 36, register 39 and write-in control circuit 40 are all formed in the same integrated circuit and all the circuits are formed on one chip.

With this construction, n-bit memory data $M_A$ and $M_B$ of a desired row of memory cell arrays 31 and 34 are read out by means of readout control circuits 32 and 35 and supplied together with n-bit data $a_0$ stored in register 39 to logic operation circuit 36. In this case, 1 n bit data of memory data $M_A$ of memory cell array 31 and corresponding n bit data of register 39 are respectively supplied to n exclusive-OR circuits 37 of logic operation circuit 36. Further, n outputs of n exclusive-OR circuits 37 and corresponding n bit data of memory data $M_B$ of memory cell array 34 are respectively supplied to n OR circuits 38. Outputs of OR circuits 38 are supplied to write-in control circuit 33 of memory cell array 31 and outputs of exclusive-OR circuits 37 are supplied to write-in control circuit 40 of register 39. That is, logic operation circuit 36 utilizes n exclusive-OR circuits 37 and n OR circuits 38 to logically processing data $M_A$, $M_B$ and $a_0$ for each bit. The result of the operation is written into n-bit memory cells of the original row of memory cell array 31 and into register 39 under a control of write-in control circuit 33.

Next, the concrete operation of the memory device of FIG. 5 is explained with reference to FIGS. 6A to 6C. Also, in this case, each of memory cell arrays 31 and 34 is constituted by memory cells arranged in a matrix form of 10 rows x 8 columns (m=10 and n=8). FIG. 6A shows the memory state of picture element data stored in memory cell array 31 before the logic operation is effected and FIG. 6B shows the memory state of picture element data stored in memory cell array 34 before the logic operation is effected. FIG. 6C shows the memory state of picture element data stored in memory cell array 31 after the logic operation is effected.

First, 8-bit data on row "0" or 0th row of each of memory cell arrays 31 and 34 is read out and supplied to logical operation circuit 36. At the same time, 8-bit data stored in register 39 is also supplied to logical operation circuit 36. In this case, the content of register 39 is previously cleared and all the 8 bit memory data are set at "0". Then, exclusive-OR circuits of logical operation circuit 36 perform the exclusive-OR operation to derive exclusive-OR data between 8 bit data from memory cell array 31 and corresponding bit data from register 39. Further, OR circuits 38 perform the logical operation to derive logical sums between 8 bit data of the result of the exclusive-OR operation and corresponding bit data from memory cell array 34. The result of the above logical operation is written into row "0" of memory cell array and register 26. That is, 8 bit data stored in row "0" of each of memory cell arrays 31 and 34 before the logical operation is effected are all "0" as shown in FIGS. 6A and 6B and 8 bit data stored in register 39 are all "0". Therefore, all the 8 bit data stored in row "0" of memory cell array 31 are set to be all "0" as shown in FIG. 6C after the logical operation is effected and data has been written.

Next, 8-bit data on row "1" or the first row of each of memory cell arrays 31 and 34 is read out and supplied to logical operation circuit 36. At the same time, 8-bit data stored in register 39 is also supplied to logical operation circuit 36. In this case, the content of register 39 is equal to the result of logical operation for the row "0" and all the 8 bit memory data are set at "0". Since 8-bit data on the first row of each of memory cell arrays 31 and 34 is "0, 1, 1, 1, 1, 1, 1, 0" before the logical operation is effected, exclusive-OR data "0, 1, 1, 1, 1, 1, 1, 0" between the 8-bit memory data of memory cell array 31 and the 8-bit data of register 39 is set into register 39. Then, the logical sum operation is effected to derive logical sum data between the 8-bit exclusive-OR data thus obtained and the 8-bit memory data of memory cell array 34, and the result of the logical sum operation is written into the first row of memory cell array 31. In this case, since the exclusive-OR data and the memory data of memory cell array 34 are both "0, 1, 1, 1, 1, 1, 1, 0", data "0, 1, 1, 1, 1, 1, 1, 0" is written into memory cell array 31.

Next, 8-bit data on row "2" or the second row of each of memory cell arrays 31 and 34 is read out and supplied to logical operation circuit 36. At the same time, 8-bit data stored in register 39 is also supplied to logical operation circuit 36. In this case, the 8-bit memory data of register 39 is equal to the result of logical operation for the first row and is set at "0, 1, 1, 1, 1, 1, 1, 0". Since 8 bit data on the second row of memory cell array 31 are all set at "0" before the the logical operation is effected, the exclusive-OR data between the memory data of memory cell array 31 and the memory data of register 39 is set to "0, 1, 1, 1, 1, 1, 1, 0" and is set into register 39. Then, the logical sum operation is effected to derive logical sum data between the exclusive-OR data thus obtained and the memory data of memory cell array 34, and the result of the logical sum operation is written into the second row of memory cell array 31. In this case, since the exclusive-OR data is "0, 1, 1, 1, 1, 1, 1, 0" and the memory data of memory cell array 34 is "0, 1, 0, 0, 0, 0, 1, 0", data "0, 1, 1, 1, 1, 1, 1, 0" is written into memory cell array 31.

Next, 8-bit data on row "3" or the third row of each of memory cell arrays 31 and 34 is read out and supplied to logical operation circuit 36. At the same time, 8-bit data stored in register 39 is also supplied to logical operation circuit 36. In this case, the 8-bit memory data of register 39 is equal to the result of logical operation for the second row and is set at "0, 1, 1, 1, 1, 1, 1, 0". Since 8-bit data on the third row of memory cell array 31 is set at "0, 0, 0, 0, 0, 1, 1, 0" before the the logical operation is effected, the exclusive-OR data between the memory data of memory cell array 31 and the memory data of register 39 is set to "0, 1, 1, 1, 1, 0, 0, 0" and is set into register 39. Then, the logical sum operation is effected to derive logical sum data between the exclusive-OR data thus obtained and the memory data of memory cell array 34, and the result of the logical sum operation is written into the third row of memory cell array 31. In this case, since the exclusive-OR data is "0, 1, 1, 1, 1, 0, 0, 0" and the memory data of memory cell array 34 is "0, 1, 0, 0, 1, 1, 1, 0", data "0, 1, 1, 1, 1, 1, 1, 0" is written into memory cell array 31.

Next, 8-bit data on row "4" or the fourth row of each of memory cell arrays 31 and 34 is read out and supplied to logical operation circuit 36. At the same time, 8-bit data stored in register 39 is also supplied to logical operation circuit 36. In this case, the 8-bit memory data of register 39 is equal to the result of logical operation for the third row and is set at "0, 1, 1, 1, 1, 0, 0, 0". Since 8 bit data on the fourth row of memory cell array 31 are all set at "0" before the the logical operation is effected, the exclusive-OR data between the memory data of memory cell array 31 and the memory data of register 39 is set to "0, 1, 1, 1, 1, 0, 0, 0" and is set into register 39. Then, the logical sum operation is effected to derive logical sum data between the exclusive-OR data thus obtained and the memory data of memory cell array 34, and the result of the logical sum operation is written into the fourth row of memory cell array 31. In this case, since the exclusive-OR data is "0, 1, 1, 1, 1, 0, 0, 0" and the memory data of memory cell array 34 is "0, 1, 0, 0, 1, 0, 0, 0", data "0, 1, 1, 1, 1, 0, 0, 0" is written into memory cell array 31.

The same operations as described above are sequentially effected for each of the fifth to ninth rows of memory cell arrays 31 and 34. As a result, picture element data obtained by logically processing original picture element data can be stored in memory cell array 31 as shown in FIG. 6C.

In the above memory device, since all the circuits are formed in the same integrated circuit and an amount of data which can be processed for each access to memory cell arrays 31 and 34 can be set equal to data amount of one row, logic operation circuit 36 can be efficiently operated. As a result, a large amount of picture element data can be processed at a high speed.

Further, in each of the above embodiments, registers 26 and 39 are simply used as a work register for effecting the data storing/readout operation. However, instead of the above registers, registers having a shifting function for shifting and outputting the operation result to the exterior can be used.

Figure 7:
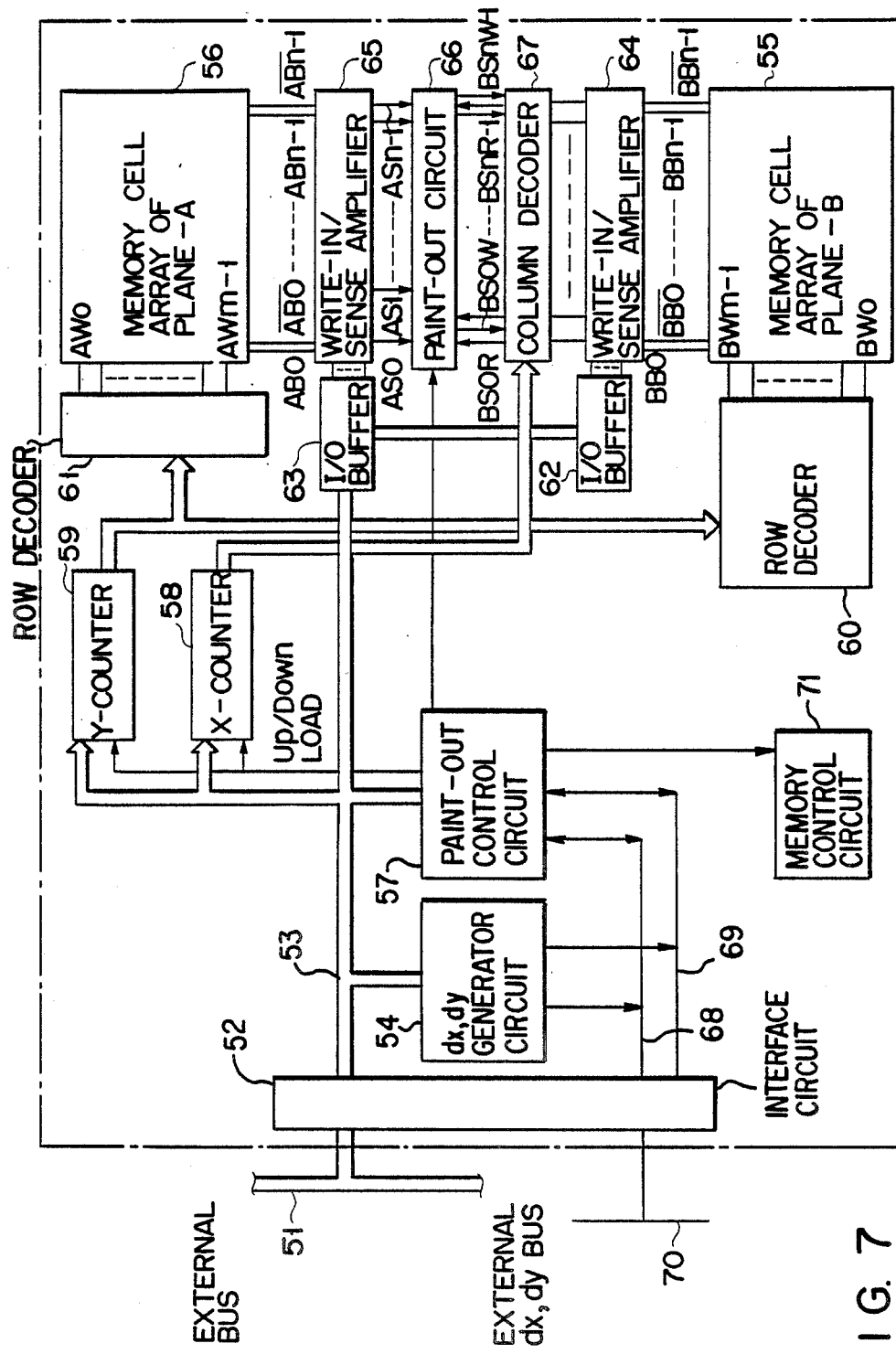
FIG. 7 is a block diagram showing the construction of a circuit to which this invention is applied and which is constituted by using the memory device of the second embodiment shown in FIG. 5.

FIG. 7 is a block diagram showing the construction of a circuit to which this invention is applied and which is constituted by using the memory device of FIG. 5. The applied circuit is a character pattern generator circuit for use in a word processor or the like for generating filled (fully dotted) character patterns based on outline font data.

Outline font data is supplied to dx and dy generation circuit 54 via external data bus 51, interface circuit 52 and internal data bus 53. The outline-dot converting operation is effected by dx and dy generation circuit 54 to derive quantized data (dx, dy) approximated to a straight line or curved line. Quantized data (dx, dy) takes one of the values of "+1", "−1" and "0" and pattern drawing data is written into two memory cell arrays 55 and 56 based on the quantized data. In this case, in order to fill an area surrounded by the outline, pattern drawing data having been subjected to the singular point processing is written into memory cell array 56 instead of simple pattern drawing data which directly corresponds to the pattern to be drawn. Pattern drawing data is written into memory cell arrays 55 and 56 by using X counter 58, Y counter 59, row decoder 60 of memory cell array 55, row decoder 61 of memory cell array 56, I/0 buffer circuits 62 and 63 for respective memory cell arrays 55 and 56, and write-in/sense amplifier circuits 64 and 65 for respective memory cell arrays 55 and 56 which are all controlled by means of fill control circuit 57.

After pattern drawing data has been written into memory cell arrays 55 and 56, data stored in memory cell arrays 55 and 56 are read out for each row and supplied to fill circuit 66 in order to fill an area surrounded by the outline. Fill circuit 66 includes register 39 and write-in control circuit 40 of FIG. 5 to effect the logical operation corresponding to that of logical operation circuit 36. Data subjected to the logical processing is written for each row into memory cell array 55 by means of row decoder 60, column decoder 67 and write-in/sense amplifier circuit 64. In FIG. 7, internal dx bus 68 and internal dy bus 69 are respectively connected to external dx and dy bus 70 via interface circuit 52. Further, memory control circuit 71 controls the above circuits based on the output of fill control circuit 57.

Memory cell arrays 55 and 56 in this embodiment respectively correspond to memory cell arrays 31 and 34 of FIG. 5. Row decoder 60, write-in/sense amplifier circuit 64 and column decoder 67 correspond to a circuit including readout control circuit 32 and write-in control circuit 33 of FIG. 5. Further, row decoder 61 and write-in/sense amplifier circuit 65 correspond to readout control circuit 35 of FIG. 5.

FIG. 8 is a circuit diagram showing the detail construction of fill circuit 66 in the applied circuit of FIG. 7. The circuit is constituted by inserting 1-bit latch 39a for storing corresponding 1-bit data of register 39 in a path between each of exclusive-OR circuits 37 and a corresponding one of OR circuits 38 of logic operation circuit 36 of FIG. 5 in which each bit portion is constituted by exclusive-OR circuit 37 and OR circuit 38. In this example, 1-bit latch 39a can be cleared by a clear signal.

FIG. 9 is a circuit diagram showing another detail construction of fill circuit 66 in the applied circuit of FIG. 7. The fill circuit additionally includes selection circuits 85 which are respectively connected between 1-bit latch circuits 39a and corresponding OR circuits 38 of the fill circuit of FIG. 8 and each have OR circuit 81, two AND circuits 82 and 83 and inverter 84. Each of selection circuits 85 selects a corresponding one of outputs of 1-bit latches 39a or a corresponding one of readout data AS0R to AS(n-1)R according to 2-bit mode selection signals M0 and M1.

With the above construction, when 2-bit mode selection signals M0 and M1 are set at "0" level, outputs of AND circuits 82 and 83 of each selection circuit 85 are both set at "0" level. If, in this condition, data is written into memory cell array 55, the content of memory cell array 55 is cleared. When 2-bit mode selection signals M0 and M1 are respectively set at "0" and "1" levels and if data is written into memory cell array 55, data of character pattern having no boundary line is written into memory cell array 55. Further, when 2-bit mode selection signal M0 is set at "1" level and if data is written into memory cell array 55, data of character pattern having a boundary line is written into memory cell array 55.

Figure 10A:
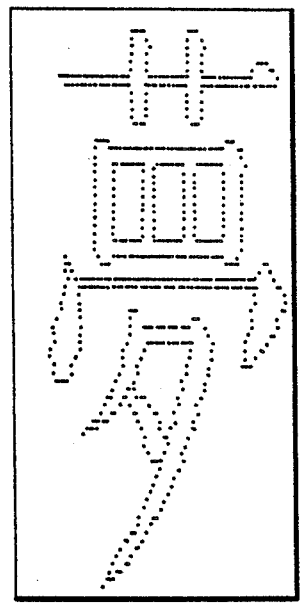
FIGS. 10A to 10C are diagrams showing the data memory state of each memory cell array in the applied circuit of FIG. 7.
Figure 10B:
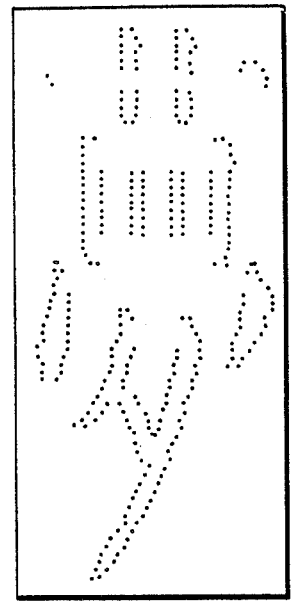
Figure 10C:
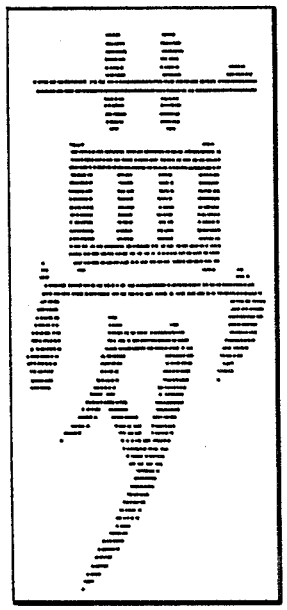
Figure 11:
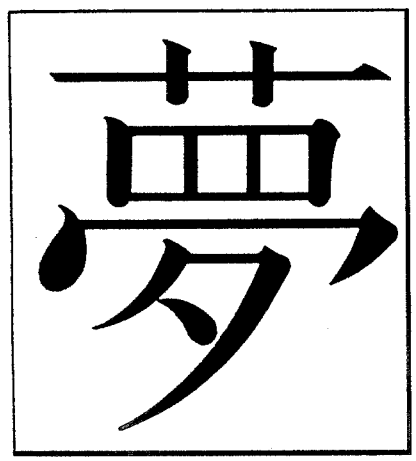
FIG. 11 is a diagram showing an example of an extremely fine character pattern obtained by the applied circuit of FIG. 7.

Now, an example of the fill processing effected by using the applied circuit of FIG. 7 is explained with reference to FIGS. 10A to 11. FIG. 10A shows the data storing state of memory cell array 56 before the fill processing is effected and FIG. 10B shows the data storing state of memory cell array 55 before the fill processing is effected. Further, FIG. 10C shows the data storing state of memory cell array 55 after the fill processing has been effected. FIG. 11 shows an example of an extremely fine character pattern obtained by increasing the number of dots in comparison with the case of FIG. 10C and effecting the processing operation.

As described above, according to this invention, a memory device with operating function can be provided by which a large amount of picture element data can be processed at a high speed and an extremely fine character pattern such as outline font can be generated in a brief period of time.

What is claimed is:

1. A memory device having an operating function comprising:
    a first memory cell array, having memory cells arranged in a matrix form of m rows × n columns;
    first readout control means, for selecting one of the rows of said first memory cell array, to read out n-bit data therefrom;
    first write-in control means, for selecting one of the rows of said first memory cell array, to write n-bit data therein;
    register means arranged independent from said first memory cell array, for storing n-bit data therein; and
    logical operation means for logically processing n-bit data read out from said first memory cell array, under a control of said first readout control means, with the content of a corresponding one of bits of n-bit data stored in said register means used as a variable to derive the result of logical operation for each bit, n-bit data constructed by bits of the result of logical operation being written into a desired one of the rows of said first memory cell array, under a control of said first write-in control means, wherein said first memory cell array, first readout control means, first write-in control means, register means, and logical operation means are formed in the same integrated circuit.

2. A memory device having an operating function according to claim 1, which further includes second write-in control means, arranged in said integrated circuit, for controlling the write-in operation of data into said register means and in which said second write-in control means writes n-bit data constructed by bits of the result of logical operation, obtained by means of said logical operation means, into said register means.

3. A memory device having an operating function according to claim 1, wherein said logical operation means includes exclusive-OR means for effecting the exclusive-OR operation between bits of data read out from said first memory cell array by means of said first readout control means and corresponding bits of data stored in said register means, to derive exclusive-OR data.

4. A memory device having an operating function according to claim 3, wherein said exclusive-OR means includes n exclusive-OR circuits which are connected to receive respective bits of data read out from said first memory cell array at one input terminal and respective bits of data stored in said register means at the other input terminal.

5. A memory device having an operating function according to claim 1, which further includes a second memory cell array, disposed separate from said first memory cell array in said integrated circuit, and second readout control means, formed in said integrated circuit, for controlling the data readout operation to select one row of said second memory cell array so as to read out n-bit data and in which said logical operation means performs the logical operation with the n-bit data read out from said second memory cell array by means of said second readout control means used as a variable.

6. A memory device having an operating function according to claim 1, which further includes a second memory cell array, disposed separate from said first memory cell array in said integrated circuit, and third write-in control means, formed in said integrated circuit, for controlling the data write-in operation to write n-bit, data into a selected one of the rows of said second memory cell array and in which said third write-in control means writes n-bit data constructed by bits of the result of logical operation, obtained by means of said logical operation means, into a selected one of the rows of said second memory cell array.

7. A memory device having an operating function according to claim 5, which further includes third write-in control means, formed in said integrated circuit, for controlling the data write-in operation to write n-bit data into said second memory cell array and in which said third write-in control means writes n-bit data constructed by bits of the result of logical operation, obtained by means of said logical operation means, into said second memory cell array.

8. A memory device having an operating function according to claim 5, wherein said logical operation means includes exclusive-OR means for effecting the exclusive-OR operation between bits of data read out from said first memory cell array by means of said first readout control means and corresponding bits of data stored in said register means, to derive exclusive-OR data, and OR means for effecting the logical operation between bits of data read out from said second memory cell array by means of said second readout control means and corresponding bits of data output from said exclusive-OR means, to derive logical sum data.

9. A memory device having an operating function according to claim 8, wherein said exclusive-OR means includes n exclusive-OR circuits which are connected to receive respective bits of data read out from said first memory cell array at one input terminal and respective bits of data stored in said register means at the other input terminal, and said OR means includes n OR circuits connected to receive respective bits of data read out from said second memory cell array at one input terminal and corresponding data output from said n exclusive-OR circuits at the other input terminal.

10. A memory device having an operating function, comprising:
- a first memory cell array, having memory cells arranged in a matrix form of m rows x n columns;
- first readout control means, for selecting one of the rows of said first memory cell array, to read out n-bit data therefrom;
- first write-in control means, for selecting one of the rows of said first memory cell array, to write n-bit data therein;
- a second memory cell array, disposed separate from said first memory cell array and having memory cells arranged in a matrix form of m rows x n columns;
- second readout control means, for selecting one of the rows of said second memory cell array, to read out n-bit data therefrom;
- second write-in control means, for selecting one of the rows of said first memory cell array, to write n-bit data therein;
- register means arranged independent from said first and second memory cell arrays, for storing n-bit data therein;
- second write-in control means, for writing n-bit data into said register means;
- first logical operation means, for logically processing n bit data read out from said first memory cell array, under a control of said first readout control means, together with corresponding bits of n-bit data stored in said register means, to derive the result of logical operation for each bit, n-bit data constructed by bits of the result of logical operation effected by said first logical means being written into a desired one of the rows of said first memory cell array, under a control of said first write-in control means, and
- second logical operation means, for logically processing n bit data read out from said second memory cell array, under a control of said second readout control means, together with corresponding bits of n-bit data constructed by bits of the result of logical operation obtained by said first logical operation means, to derive the result of logical operation for each bit, n-bit data constructed by bits of the result of logical operation effected by said second logical means being written into said register means, under a control of said second write-in control means,
- wherein said first and second memory cell arrays, first and second readout control means, first and second write-in control means, register means, and first and second logical operation means are formed in the same integrated circuit.

11. A memory device having an operating function according to claim 10, wherein said first logical operation means includes exclusive-OR means for effecting the exclusive-OR operation between bits of data read out from said first memory cell array by means of said first readout control means and corresponding bits of data stored in said register means, to derive exclusive-OR data, and said second logical operation means includes OR means for effecting the logical operation between bits of data read out from said second memory cell array by means of said second readout control means and corresponding bits of data output from said exclusive-OR means, to derive logical sum data.

12. A memory device having an operating function according to claim 11, wherein said exclusive-OR means includes n exclusive-OR circuits which are connected to receive respective bits of data read out from said first memory cell array at one input terminal and respective bits of data stored in said register means at the other input terminal, and said OR means includes n OR circuits connected to receive respective bits of data read out from said second memory cell array at one input terminal and corresponding bits of data output from said n exclusive-OR circuits at the other input terminal.

13. A memory device having an operating function according to claim 10, wherein said first readout control means and first write-in control means include a first row decoder, a first write-in/sense amplifier circuit, and a column decoder.

14. A memory device having an operating function according to claim 10, wherein said second readout control means includes a second row decoder and a second write-in/sense amplifier circuit.

* * * * *